March 3, 1959
W. FALL
2,875,811
CAR SEAT
Filed June 16, 1954
2 Sheets-Sheet 2
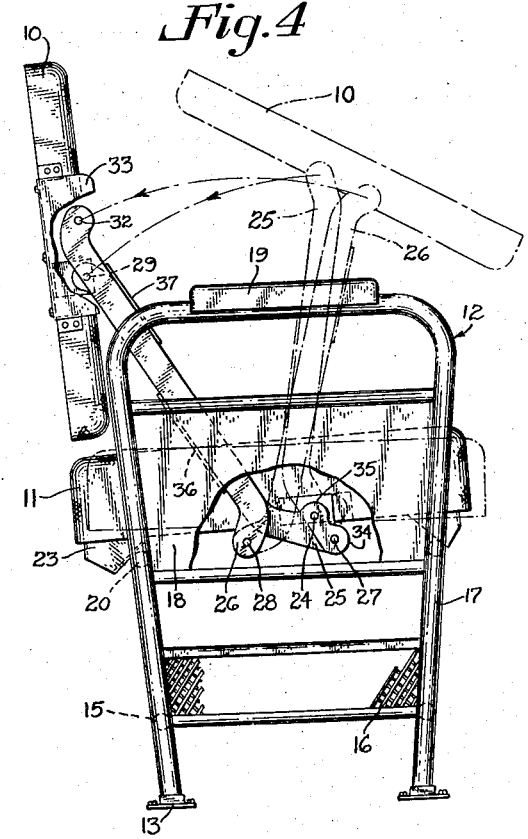
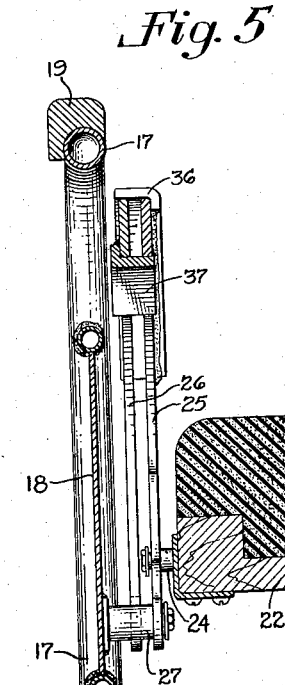
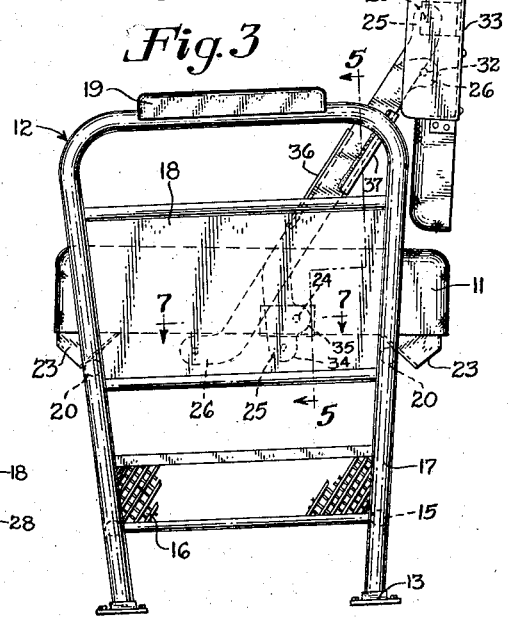
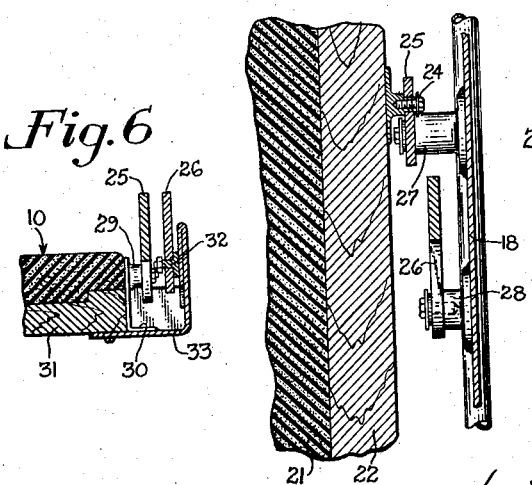
Inventor
Wilfrid Fall
By Wayne Morris Russell
Attorney

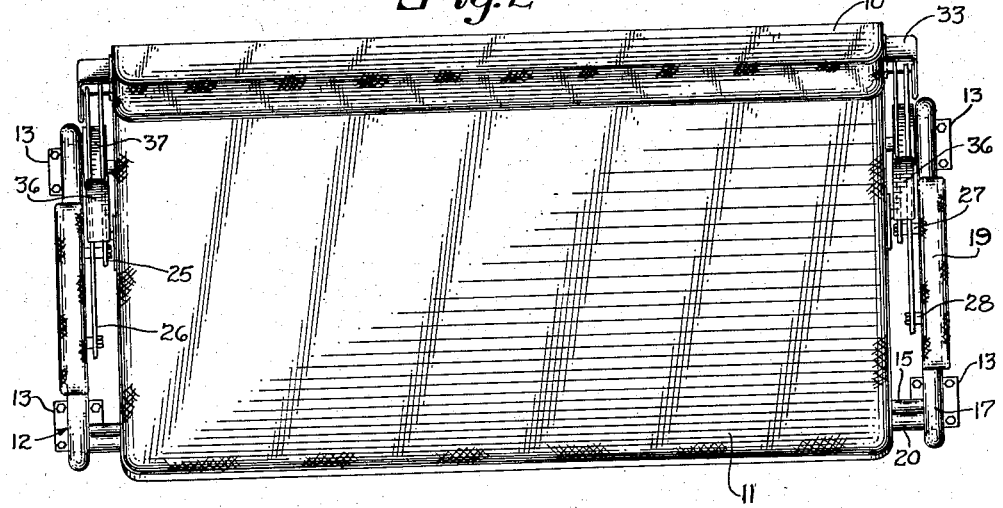
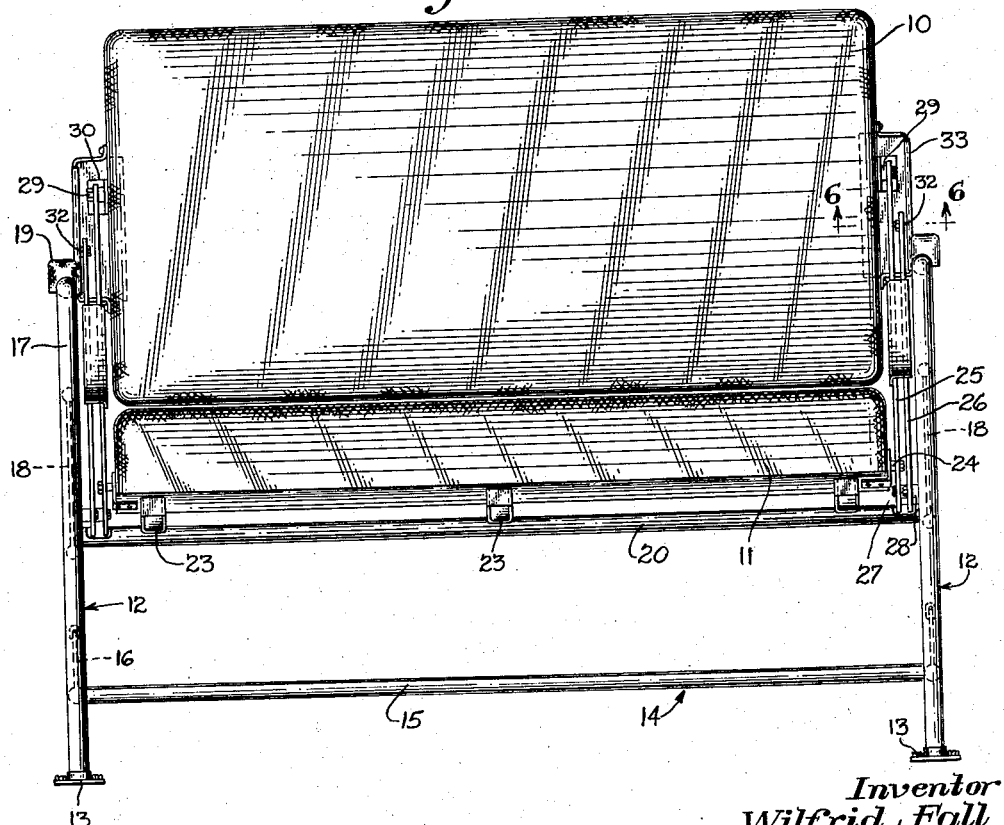

United States Patent Office 2,875,811
Patented Mar. 3, 1959

2,875,811

CAR SEAT

Wilfrid Fall, Worcester, Mass., assignor to Pullman-Standard Car Manufacturing Company, Chicago, Ill., a corporation of Delaware Application June 16, 1954, Serial No. 437,095

4 Claims. (Cl. 155—103)

This invention relates to car seats and more particularly to railway car seats of a double duty nature whereby the seat back may face in either direction merely by turning over and the seat cushion automatically adjusts its tilt to correspond to the seat back position.

This type of railway car seat, commonly referred to as the "turnover" seat, is quite common to the industry and has the advantages of enabling the passengers to face either desired direction and most important, enables a railway car to travel in either direction, without turning around, with the passengers facing forward.

The present-day "turnover" seat comprises an arrangement wherein by the movement of the seat back arms a complicated and cumbersome tilting arrangement operates to move the seat cushion to the desired arrangement. To simplify and structurally improve this condition and, at the same time, to present a light, durable and attractive modern car seat structure is the purpose of this invention.

Thus, the principal object of this invention is to provide a turnover seat structure of simple yet structurally sound construction.

Another object of this invention is to provide a direct connection between the movable seat back arms and the seat cushion frame for automatic tilting of the seat upon movement of the arms, thereby eliminating any complicated and unnecessary tilting structure beneath the seat cushion frame.

Still another object of this invention is to provide a turnover type of railway car seat having modern beauty, durability, economy of manufacture and ease of assembly.

These and other objects will become more readily apparent from the exemplification hereinafter described and from the accompanying illustrations, in which:

Fig. 1 is a front elevational view of a railway car seat embodying the invention;

Fig. 2 is a plan view of the car seat;

Fig. 3 is a side elevational view of the car seat in one position, facing in one direction;

Fig. 4 is a side elevational view of the car seat in another position, facing the other direction, and showing in phantom the relation of various parts during the actual turnover movement;

Fig. 5 is a vertical sectional view along the line 5—5 in Fig. 3;

Fig. 6 is a horizontal sectional view along the line 6—6 in Fig. 1; and

Fig. 7 is a horizontal sectional view along the line 7—7 in Fig. 3.

Referring to the drawings a car seat is illustrated having a seat back 10 and a seat cushion 11 attached at each end to a side frame 12. Each side frame is secured to the floor by floor securing devices 13 and is joined across the underneath of the cushion 11 by a luggage rack assembly 14 which has a tubular railing 15 around the base, a flooring (not shown) and mesh sides 16.

Each side frame 12 is comprised of a tubular inverted U-shaped frame 17, with a side panel 18 extending between the sides of the frame, and an arm rest 19 on the upper frame portion. A pair of tubular rails 20 extend between and secure the side frames immediately below the cushion 11. It is readily apparent that the basic frame for the seat is quite simple, though structurally sound.

The seat cushion 11 is of common manufacture, having an upper portion 21 of ordinary cushion material secured on a solid base 22. A plurality of angularly faced rockers 23 are fixed to the base 22 for constant contact with the rails 20, the seat cushion thereby being tiltable on the rails, as will be explained in detail hereinafter. Also attached at each end of the cushion and at a predetermined location is a cushion mounting bracket with a pivot stud 24 on which is pivoted an inner seat back arm 25.

The arm 25 and an outer seat back arm 26, which are parallel and in juxtaposition, are both pivotally attached at their bottom ends, by means of pivot studs 27 and 28 respectively, to the side panel 18 of the side frame 12. At their upper ends, the arm 25 is attached by means of a pivot stud 29 and brace 30 to a seat back frame 31, and the arm 26 is attached by means of a pivot device 32 to a cover plate 33 of angular section which is also attached to the seat back frame 31 by one flange with the other flange spaced outwardly of and parallel to the side or end of the seat back 10.

By simply grasping the lower portion of the seat back and pushing the back toward the other end of the side frame, the back turns completely over to face the opposite direction. The mere movement of the inner seat back arm 25 tilts the seat cushion 11 to the desired tilt with its forward edge higher than the rear edge, in accord with the changed seat back position, due to a very simple and direct connection between the arm and the cushion, namely the mounting bracket pivot 24. This result is accomplished due to the particular arrangement at the lower end of the inner arm 25 (Fig. 3). The arm is bent or angled at its lower end and has a projection on the edge thereof between the end and the point of bend providing a configuration of a toe and heel of a boot, wherein the pivot stud 27 is attached at the toe 34 and the cushion bracket pivot 24 at the heel 35, or edge projection. Referring to Fig. 4, it is apparent that the heel 35 has completed an arc above and about the pivot 27 from its position in Fig. 3. By predetermining the placement of the cushion bracket pivot 24, the desired cushion tilting movement is obtained. The resulting amount of tilting of the seat cushion 11, due to the actuation of the arms 25 and 26 transmitting movement to the cushion by means of the cushion bracket pivot 24, is obtained by a predetermined well known design relationship between the angularly faced cushion rockers 23 and the fixed frame rails 20, the frame 12 thereby acting as a fulcrum upon which the cushion rocks or tilts. Thus, by means of a simple direct contact, the cushion mounting bracket pivot 24, between the inner arm 25 and the cushion frame 22, the proper tilting of the cushion is obtained by the movement of the arms 25 and 26, eliminating all unnecessary tilting mechanism having slots, lugs, wrist pins and extensive rod connections presently used for this purpose.

For supporting the seat back at either position and holding the seat cushion in place, each arm is supplied with a U-shaped support which overlaps the other arm. The support 36 for the inner arm 25 and the support 37 for the outer arm 26 are secured on the respective edges of the arms which separate during the turnover movement as shown in phantom in Fig. 4, so as not to interfere with the movement of the arms. However, when the arms reach a parallel position (Figs. 3 and 4) where they tend to separate in a direction opposite that shown in phantom in Fig. 4, the supports lock the arms in the parallel relationship, thus preventing their further movement. The seat back is thus supported by the arms independently of the seat cushion and the seat cushion through its connection to arms 25 is held in the desired position relative to the back and frame. The arms 25 and 26 have their upper and lower ends reversely bent as shown to facilitate their connections to the side frame and seat back and achieve the turning of the seat back while the arms remain in overlapping relation, as is evident from a comparison of the full and broken line positions of the arms shown in Figs. 3 and 4.

Thus, a turnover type car seat is presented having, in addition to durability, light weight and economy of manufacture, a simplified automatic seat tilting arrangement directly operable upon actuation of the seat back arms.

What is claimed is:

1. In a reversible car seat structure, a basic frame, a seat cushion, a seat back having a cushion face, a pair of generally upright laterally juxtaposed arms having their upper ends pivoted on fixed axes to spaced apart points on the back and having their lower ends pivoted on fixed axes to spaced apart points on the frame, one of said arms being connected on a fixed pivotal axis at a point above its lower end to the seat cushion whereby movement of the arms about their lower end pivots will swing the back from one end of the frame to the other with reversal of the cushion face on the back and will shift the seat cushion fore and aft in the frame, and means provided on the frame for engagement by the seat cushion for supporting the seat cushion in its terminal fore and aft positions.

2. The combination claimed in claim 1, in which each arm is reversely bent at its end portions, with the adjacent ends of the two arms oppositely directed, so that the portions of the arms intermediate the end portions are maintained in overlapping relation during their movement about their lower end pivots.

3. The combination claimed in claim 1, in which each arm is provided along one edge with a flange extending over the adjacent edge of the other arm to engage and support said other arm and hold said two arms together when the seat cushion is in either of its terminal positions.

4. The combination claimed in claim 1, in which each arm is reversely bent at its end portions, with the adjacent ends of the two arms oppositely directed, so that the portions of the arms intermediate the end portions are maintained in overlapping relation during their movement about their lower end pivots, and in which each arm is provided along one edge with a flange extending over the adjacent edge of the other arm to engage and support said other arm and hold said two arms together when the seat cushion is in either of its terminal positions.

References Cited in the file of this patent

UNITED STATES PATENTS

| | | |
|---|---|---|
| 303,508 | Hale | Aug. 12, 1884 |
| 451,357 | Bailey | Apr. 28, 1891 |
| 475,109 | Hale | May 17, 1892 |
| 484,434 | Johnston | Oct. 18, 1892 |
| 596,925 | Udstad | Jan. 4, 1898 |